Sept. 6, 1966   W. H. SCHNEIDER   3,270,590
LATHE DRILL ATTACHMENT
Filed March 30, 1964

INVENTOR.
William H. Schneider
BY
Green, McCallister &
Miller
HIS ATTORNEYS

United States Patent Office 3,270,590
Patented Sept. 6, 1966

3,270,590
LATHE DRILL ATTACHMENT
William H. Schneider, 3217 Mount Troy Road,
Pittsburgh, Pa.
Filed Mar. 30, 1964, Ser. No. 355,544
9 Claims. (Cl. 77—6)

This invention relates to an attachment for machine lathes and the like, to be used in drilling accurate, long holes.

In shop practice, the machine lathe is often employed for drilling work pieces where it is required to produce concentric holes and surfaces thereon. This requirement is fairly common.

The current common practice for drilling holes with conventional lathes, involves the use of a stationary (non-rotating) drill that is mounted in the lathe tailstock spindle or turret. The drill is advanced into the turning work piece and relative motion therebetween causes the cutting action. I have found that long holes (small diameter to length ratio) are often inaccurately formed due to the tendency for the drill to flex, possibly upon encountering some slight non-uniformity in the work piece. The initial flexure seems to be small and insignificant in its result on the accuracy of the hole. However, drilling beyond the initial disturbance magnifies the inaccuracy, and a crooked hole results that does not maintain a true center throughout its length. It will be apparent that lathe drilling operations of this type produce a high and uneconomical percentage of unusable work pieces or scrap. I have determined that the cost of forming larger long holes or bores could be significantly reduced if it were possible to repeatedly drill an accurate hole to be used as a guide. It will be appreciated that an inaccurate guide is of very little use. The present practice of forming accurate large long holes involves drilling a rough hole of sufficient smaller-than-the-desired dimension to permit the expected inaccuracy due to drill flexure. The hole is then finished by a boring tool or inside cutting tool that operates independently of the rough hole, to form an accurate finished bore. Of course, a heavy boring operation is slower, more difficult to set up, and generally more expensive than a drilling operation.

While I am aware that live tools have been employed in conjunction with lathe type production tools for certain specific hole forming operations, to date there has been no practical solution of problems set forth above as encountered in the average machine shop.

Accordingly, it has been an object of my invention to fully investigate the operational problems encountered in drilling long holes on conventional lathes;

Another object of my invention has been to devise an inexpensive portable tool for temporary use in conjunction with a conventional lathe whenever it is necessary to drill an accurate long hole;

Another important object of my invention has been to devise a lathe attachment for drilling long holes that is fully adaptable to standard turret lathes as well as to ordinary engine lathes or screw machines without the use of special expensive equipment and without modifying the lathe itself in any way.

These and other objects of my invention will become more apparent to those skilled in the art upon reading and understanding the following description of my invention, its novel concepts, and some preferred specific illustrative embodiments thereof.

One phase or concept of my invention relates to a portable self-powered lathe drill apparatus that is mounted directly into and supported solely by the lathe tailstock or turret as the case may be. The apparatus includes a housing having alternative straight or tapered shanks attachable thereto as may be required by the particular lathe in question. A drill chuck is supported by the housing coaxially with the lathe turning center, thus permitting the thrust forces encountered in drilling to be transmitted directly to the lathe. The housing also supports a power unit or motor which is mounted directly thereon and is geared to the chuck for driving it. By mounting the motor directly onto the housing and gearing it to the chuck, the entire apparatus is formed into a compact integral and easily manipulated unit.

Another phase or concept of my invention involves the construction of the lathe drill apparatus wherein a one way gear drive such as a worm and gear is employed to provide a relatively high step-down gear ratio and to prevent accidental reverse driving of the motor by the lathe which could damage the motor. I have determined that relatively low drill speeds will satisfy the requirements of the principal function of my drill, i.e., the production of an accurate long hole. I prefer, however, to employ slightly higher drill speeds than absolutely necessary, to gain the secondary advantage of an increase in relative velocity which will materially shorten drilling time required. This latter feature is particularly important in situations where drilling is being done on large relatively low speed lathes. Accordingly, I prefer to employ a step-down gear that will provide a moderately low speed, thus employing a relatively small motor and obtaining therefrom a relatively high cutting torque. In any event, I have determined that the preferred method of drilling with my apparatus involves running the lathe at its ordinary drilling speed which is usually the maximum speed available on any basic set-up. The lathe drilling attachment is run at its single moderately low speed, so that the great majority of the power consumed in the drilling operation is provided by the lathe motor rather than the drilling attachment. It will be recognized that inasmuch as the cutting torque will be the same for both motors, the power developed by each motor will be a function of its absolute speed.

A further phase or concept of my invention involves the construction of a lathe drill apparatus wherein the power conduit is connected to the drill motor via a rotating or universal coupling, so that the apparatus can be employed on turret lathes without concern for the continuous indexing of the turret.

These phases or novel concepts will be more fully understood in light of the following description of some preferred specific illustrative embodiments of my invention wherein reference is made to the accompanying drawings, of which:

Figure 1:
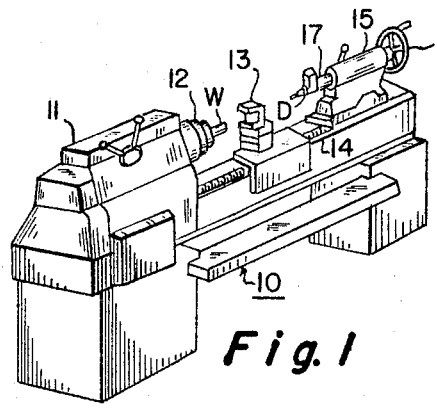
FIGURE 1 is a perspective pictorial view of an engine lathe fitted with a drilling apparatus constructed in accordance with my invention.

Referring now more specifically to the drawings, in FIGURE 1 there is shown a conventional turning tool or machine lathe such as an engine lathe 10. The lathe 10 has a headstock 11 which carries the driving mechanism of the lathe and supports a work piece holding chuck 12. In FIGURE 1 a work piece W is shown in the chuck 12. A carriage 13 is mounted on the bed 14 of the lathe 10 for supporting various working tools. The lathe 10 also has a tailstock 15 that is mounted on the lathe bed 14. A spindle or socketed tool holding part 17 is supported by the tailstock 15 and is movable longitudinally of the lathe 10 by a fine advance or feed member 18. The spindle 17 is normally employed for holding stationary drills, dead centers, facing tools and the like. A mounting socket 19 in the spindle 17 usually has a conventional Morse taper.

Figure 2:
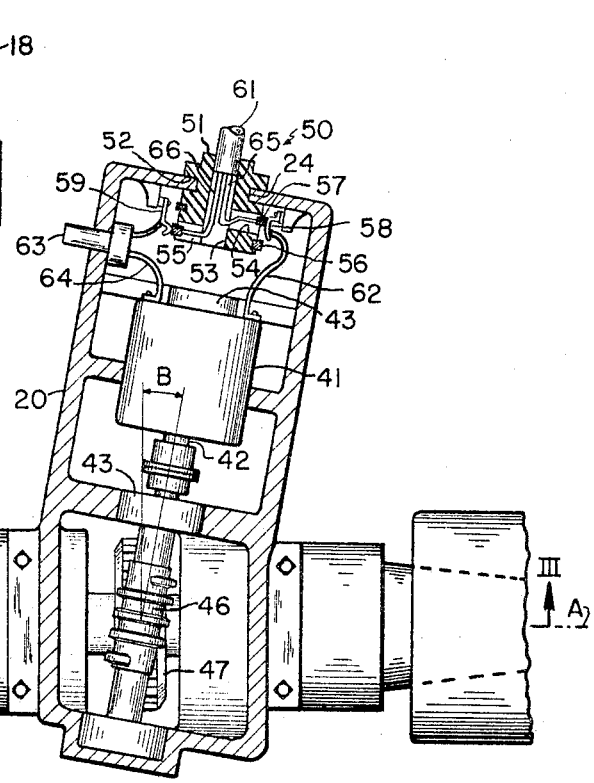
FIGURE 2 is an enlarged front or elevational view in cross section showing the details of the drilling apparatus shown in FIGURE 1.
Figure 3:
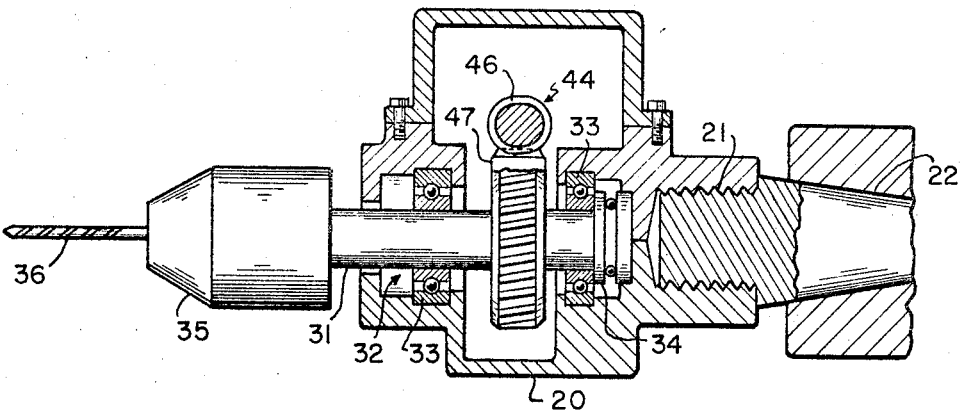
FIGURE 3 is a sectional view taken along line III—III of FIGURE 2.
Figure 4:
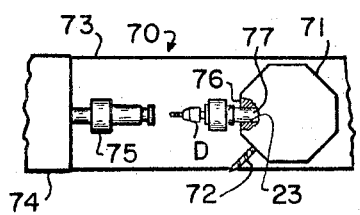
FIGURE 4 is a top or plan view of a turret lathe fitted with a lathe drilling apparatus like that shown in FIGURES 1 and 2.

The lathe 10 is shown as having a portable self-powered lathe drill apparatus or tailstock drilling attachment D constructed in accordance with my invention, securely mounted in its socket 19. The drilling attachment D is better shown in the enlarged cross-sectional view of FIGURE 2. The drilling attachment D has a casing or housing 20 that is preferably cast in two halves, and held together with screws (not shown) to permit easy assembly of its contents. The housing 20 is provided at its rear or right-hand end with a threaded opening or bore 21 in which a tapered shank member 22 is securely attached. In use, the shank member 22 is frictionally held in the socket 19 as shown. The shank member 22 is removably connected to the housing 20 so that it can be readily replaced with a straight or cylindrical mandrel as is conventionally required for mounting auxiliaries in turret lathes. A cylindrical shank 23 for use in conjunction with my drilling attachment device is shown in FIGURE 4.

Within the housing 20 there is mounted a main or output shaft 31 which is supported by suitable bearing means 32 such as ball bearings 33 and thrust bearing 34. The bearing means 32 thus establishes an axis of rotation A—A that is coaxial with the shank member 22. The thrust bearing 34 connects the rearward or right-hand end of the output shaft 31 to the housing 20 to thereby transmit drilling thrust directly to the shank member 22 and the lathe tailstock 15. A drill holding mechanism or chuck 35 of conventional construction is secured to the forward or left-hand end of the output shaft 31 and is adapted to carry various small drills or similar tools 36.

The upper part of the housing 20 contains the power mechanism which can consist of a pneumatic or electric motor 41 of the type generally employed in small drilling devices. A motor shaft 42 or armature of the motor 41 if elecric, is mounted for rotation about an axis that makes an acute angle B with the axis of the output shaft 31, by a pair of roller bearings 43 that are anchored to the casing 20. The motor 41 is drivingly connected to the drill shaft 31 via speed reduction gear transmission means 44 having a relatively high step-down gear ratio. In the preferred embodiment of my invention, the transmission means comprises at least one stage of worm gearing 45 including a driving worm 46 and a worm gear or wheel 47 that is intermeshed therewith. It will be appreciated by those skilled in the art that other transmissions can be employed with satisfactory results. For example, bevel gears could be employed although a several stage gear train would be required to obtain the necessary large step-down gear ratio. Also, in some applications it may be desired to employ an additional stage of gear reduction between the motor 41 and the worm 46 so as to reduce frictional losses in high worm speeds. I prefer however to keep at least the one worm stage 45 at the low speed end of the gear train to take advantage of the high gear ratio available thereby and also the relatively high strength to size ratio that is inherent in worm drives.

Adjacent the upper end of the housing 20 there is provided a rotatable electrical coupling means 50 which permits the device D to be employed on a turret lathe where it is repeatedly turned about a vertical axis. The power supply here represented by electrical conduit means or cord 61 will not kink or curl due to the revolving of the drill D in a turret since any such tendency will be immediately relieved by rotatable coupling means 50.

The rotatable coupling means 50 comprises an insulating fitting or bushing 51 having an annular, housing-receiving groove or track 52, a hollow center or bore 53, and a pair of right angle bores or side opening ports 54 and 55. A pair of brass rings or contactors 56 and 57 respectively are spaced along the bushing and shrunk in place in accordance with known practice. A pair of mutually insulated brushes or contactors 58 and 59 ride respectively on the brass rings 56 and 57 making a continuous electrical contact therewith. A wire or electrical conductor 62 connects the contactor 58 to the motor 41. Similarly, the motor 41 is connected through a two-position self-holding, or toggle switch 63 and appropriate electrical wiring or conduits 64 to the contactor 59. The electrical cord 61 contains a pair of supply wires or conduits 65 and 66 which are connected by a soldered or a pressed fit to the brass rings 56 and 57 respectively. The housing 20 has an opening 24 in its upper end which receives the groove 52 of the bushing 51. As the casing is made in two halves, the bushing 51 can easily be assembled in one half and the other half fitted thereover.

The drilling attachment D is kept on hand at any machine shop for use when, and only when, required. It is stored away from the lathe where it is not an encumbrance. The USE is as follows: Where it is required to drill an accurate long hole coaxially with a turned surface, or otherwise in a work piece that is the most conveniently drilled in a lathe, the drilling attachment D is mounted by its shank member 22 in the spindle 17 of the tailstock 15. The electrical cord 61 is plugged into a convenient power source, and the switch 63 is closed initiating operation of the motor 41. The work piece is turned by the lathe at normal drilling speed. The drill 36, while turning, is advanced into the work piece by hand or power, depending upon the nature of the work. The rotation of the drill 36 prevents any cumulative deviation of the drill 36 from the center of rotation as previously explained. As an added benefit the greater relative speed also tends to increase the drilling efficiency and reduce the overall drilling time.

The drilling attachment D can also be used on turret lathes like 70 of FIGURE 4 for high production jobs. Conventional turret lathes comprise a bed 73, a head stock 74, and a work piece holding chuck 49, all similar to those shown on the engine lathe 10 in FIGURE 1. In place of a tailstock, however, a turret 71 is provided which has a plurality of faces 76 having cylindrical tool holding sockets 77 therein which are serially indexed into an operative position. For example, if it were desired to produce a large number of articles having a large (1 inch) long accurate hole therein, the drilling attachment D would be modified only by substituting a cylindrical shank 23 for the tapered shank 22. The attachment D is mounted in one face 76 of the lathe turret 71 and fitted with a small drill 36 (¼ inch). The next or following face 76 of the turret 71 would be fitted with a 1 inch stationary drill 72. The electrical cord 61 would be plugged into a convenient electrical outlet and production begins. The turret 71 is advanced axially of the lathe to bring the turning drill 36 into the work piece to form an accurate long guide hole therein. The turret 71 is then withdrawn from the work piece and indexed to bring the stationary drill 72 into cutting position. Again the turret 71 is axially advanced now bringing the stationary drill into cutting engagement with the work piece and accurately forming the required long accurate 1 inch hole. The guide hole prevents deviation of the large drill from the center. It will thus be seen that a single drilling attachment D will satisfy shop requirements even when it has a chuck receiving diameter of only ¼ inch. Production on the turret lathe continues as further work pieces are inserted and the turret continues to index around in a clockwise direction. For precision accuracy, where boring is necessary this tool will permit use of a closer-to-size drill than is normally possible using conventional lathe drilling methods. The electric cord 61 does not tangle or become knotted due to the continued revolving of the turret 71, due to the universal operation of the fitting 51 as explained above.

Those skilled in the art will appreciate that I have devised and developed a new and highly useful drilling attachment that can be employed conveniently and inexpensively in standard machine shops everywhere, to solve the heretofore expensive problem of inaccuracy in drilling long holes. While a preferred embodiment of my invention has been shown herein for purposes of illustration, it is to be understood that various changes may be made in this construction by those skilled in the art without departing from the spirit and disclosed concepts of the invention as particularly pointed out and defined in the appended claims.

I claim:

1. A lathe drill apparatus comprising: a housing, bearing means mounted within said housing and defining an axis of rotation, a shank member shaped to be cooperatively received by a socketed tool holding part of a conventional machine lathe, said shank member being securely attached to said housing and extending outwardly therefrom coaxially with said axis of rotation, for mounting said housing on a lathe, an output shaft supported by said bearing means, drill holding mechanism operatively mounted on said output shaft for supporting a drill coaxially with said shank member, a motor totally supported by said housing, said motor having a motor shaft, and speed reduction gear transmission means operatively connected between said motor shaft and said output shaft.

2. Lathe drill apparatus as defined in claim 1 wherein said motor shaft is inclined toward said shank at an acute angle that is substantially greater than zero degrees, but substantially less than ninety degrees.

3. Lathe drill apparatus as defined in claim 1, further comprising: conduit means for transmitting power to said motor, and rotatable coupling means operatively interconnected between said motor and said conduit means, whereby said conduit means is free to rotate with respect to said motor.

4. Lathe drill apparatus as defined in claim 1 wherein said speed reduction gear transmission includes at least one stage of worm gearing.

5. Lathe drill apparatus comprising: a housing, an output shaft positioned within said housing and lying along an axis of rotation, bearing means mounted within said housing and operatively connected to said output shaft for transferring axial forces thereon to said housing while permitting relative rotation between said output shaft and said housing, a shank member shaped to be cooperatively received by a socketed tool holding part of a conventional lathe, said shank member being attached to said housing and extending outwardly therefrom coaxially with said axis of rotation for mounting said housing on a lathe, drill holding mechanism operatively mounted on said output shaft for supporting a drill coaxially with said shank member, a motor totally supported by said housing, said motor having a motor shaft, and speed reduction gear transmission means operatively connected between said motor shaft and said output shaft.

6. In combination with a machine lathe or the like having a headstock; a work piece holding chuck supported thereby, and a tool holding part having a mounting socket that is coaxial with said chuck; a drilling attachment comprising: a housing, bearing means mounted within said housing and being coaxial with said chuck, a shank member securely attached to said housing and mounted tightly within said mounting socket for supporting said housing thereby; an output shaft supported by said bearing means, drill holding mechanism operatively mounted on said output shaft for supporting a drill coaxially with said shank member, a motor totally supported by said housing, said motor having a motor shaft, and speed reduction gear transmission means operatively connected between said motor shaft and said output shaft.

7. In combination with an engine lathe having a headstock, a work piece holding chuck supported thereby, a tailstock, and an axially movable, socketed spindle supported thereby that is coaxial with said chuck; a drilling attachment comprising: a housing, bearing means mounted within said housing coaxially with said chuck, a tapered shank member securely connected to said housing and mounted within said socketed spindle for supporting said housing thereby, an output shaft supported by said bearing means, drill holding mechanism operatively mounted on said output shaft for supporting a drill coaxially with said shank member, a motor totally supported by said housing, said motor having a motor shaft, and speed reduction gear transmission means operatively connected between said motor shaft and said output shaft.

8. In combination with a turret lathe having a headstock, a work piece holding chuck supported thereby, and a tool holding turret having a cylindrical socket portion therein, a drilling attachment comprising: a housing, bearing means mounted within said housing and defining an axis of rotation, a cylindrical shank member securely attached to said housing and mounted within said socket portion of said turret for supporting said housing thereby, an output shaft supported by said bearing means, drill holding mechanism operatively connected to said output shaft for supporting a drill coaxially with said shank member, a motor totally supported by said housing, said motor having a motor shaft, and speed reduction gear transmission means operatively connected between said motor shaft and said output shaft.

9. The combination as defined in claim 8, further comprising: conduit means for transmitting power to said motor, and rotatable coupling means operatively interconnected between said motor and said conduit means, whereby said conduit means is free to rotate with respect to said motor.

References Cited by the Examiner
UNITED STATES PATENTS

| | | | |
|---|---|---|---|
| 511,829 | 1/1894 | Witherell | 77—25 |
| 1,587,261 | 6/1926 | White | 77—60 |

FRANCIS S. HUSAR, *Primary Examiner.*